(12) United States Patent
Gomyo et al.

(10) Patent No.: US 7,778,509 B2
(45) Date of Patent: Aug. 17, 2010

(54) METHOD FOR INCIDENCE OF LIGHT INTO A PHOTONIC CRYSTAL OPTICAL WAVEGUIDE AND STRUCTURE THEREOF

(75) Inventors: Akiko Gomyo, Tokyo (JP); Jun Ushida, Tokyo (JP)

(73) Assignee: NEC Corporation, Tokyo (JP)

( * ) Notice: Subject to any disclaimer, the term of this patent is extended or adjusted under 35 U.S.C. 154(b) by 449 days.

(21) Appl. No.: 11/224,320

(22) Filed: Sep. 13, 2005

(65) Prior Publication Data
US 2006/0039649 A1 Feb. 23, 2006

Related U.S. Application Data

(63) Continuation of application No. PCT/JP2004/003084, filed on Mar. 10, 2004.

(30) Foreign Application Priority Data

Mar. 14, 2003 (JP) ............................. 2003-070474

(51) Int. Cl.
G02B 6/26 (2006.01)
(52) U.S. Cl. .......................................... 385/50; 385/31
(58) Field of Classification Search ................. 385/15, 385/31–38, 50
See application file for complete search history.

(56) References Cited

U.S. PATENT DOCUMENTS

| 6,795,621 | B2 | 9/2004 | Tokushima |
| 7,082,235 | B2 * | 7/2006 | Gunn, III ..................... 385/28 |

| 2002/0191933 | A1 | 12/2002 | Tokushima |

FOREIGN PATENT DOCUMENTS

| JP | 2002-365453 A | 12/2002 |
| JP | 2004-101740 A | 4/2004 |

OTHER PUBLICATIONS

A. Gomei et al., "25p-YA-7 Surabu-gata Photonic Kesshosen Kekkan Hikari Doharo heno Hikari Nyusha Kozo no Kento," 2002 Nen (Heisei 14 Nen), Shunki Dai 63 Kai Oyo Butsurigaku, Sep. 24, 2002, p. 912.

J. Ushida et al., "28a-YN-1 Photonic Kessho Hyomen deno Impedance Seigo to Hanshal Boshimaku Sekkei Riron," 2003 Nen (Heisei 15 Nen), Shunki Dai 50 Kai Oyo Buturigaku Kankei, Mar. 27, 2003, p. 1126.

(Continued)

*Primary Examiner*—Jerry T Rahll
(74) *Attorney, Agent, or Firm*—Foley & Lardner LLP

(57) ABSTRACT

Disclosed in a method and a device in which a wave number of light in the waveguide mode of a photonic crystal optical waveguide is matched with that of the incident light, or a intensity ratio of electric field to magnetic field of the light in the waveguide mode of the photonic crystal optical waveguide is matched with that of the incident light, and furthermore, in addition to the method above, the distribution of light intensity on the incident end surface in the waveguide mode of the photonic crystal optical waveguide is matched with that of the incident light. A photonic crystal optical waveguide and channel optical waveguide are joined together, and the structure of the channel optical waveguide is wedge shaped in the joint section.

19 Claims, 12 Drawing Sheets

OTHER PUBLICATIONS

J. Ushida et al., "28a-YN-2 Photonic Kessho Hyomen deno Impedance Seigo to Hanshal Boshimaku Sekkei Riron II" 2003 Nen (Heisei 15 Nen), Shunki Dai 50 Kai Oyo Buturigaku Kankei, Mar. 27, 2003, p. 1127.

A. Gomei et al., "25p-YA-10 Surabu-gata Photonic Kesshosen Kekkan Hikari Doharo heno Hikari Nyusha Kozo no Kento," 2002 Nen (Heisei 14 Nen), Shunki Dai 50 Kai Oyo Butsurigaku, Mar. 27, 2003, p. 1133.

M. Tokushima et al., "28p-YN-12 Photonic Kessho Doharo to Channel Doharo no Kokoritsu Setsuzoku," 2003 Nen (Heisei 15 Nen), Shunki Dai 50 Kai Oyo Butsurigaku Kankei, Mar. 27, 2003, p. 1134.

E. Miyai et al., "29p-L-5 2-Jigen Photonic Kessho Doharo to Gaibu Doharo tono Ketsugo Kaiseki," 2002 Nen (Heisei 14 Nen) Shunki Dai 49 Kai Oyo Butsurigaku Kankei, Mar. 27, 2002, p. 1038.

A. Gomyo et al., "Low Optical Loss Connection for Photonic Crystal Slab Waveguides," IEICE Transactions on Electronics, vol. E87-C, No. 3, Mar. 1, 2004, pp. 328-335.

E. Miyai et al., Analysis of coupling between two-dimensional photonic crystal waveguide and external waveguide, Applied Physics Letters, vol. 81, No. 20, Nov. 11, 2002, pp. 3729-3731.

M. Tokushima et al., "Photonic crystal line defect waveguide directional coupler," Electronics Letters, vol. 37, No. 24, Nov. 22, 2001, pp. 1451-1455.

J. Ushida et al., "Systematic design of antireflection coating for semi-infinite one-dimensional photonic crystals using Bloch wave expansion," Applied Physics Letters, vol. 82, No. 1, Jan. 6, 2003, pp. 7-9.

* cited by examiner

LIGHT-INTENSITY DISTRIBUTION
OF INCIDENT LIGHT

LIGHT-INTENSITY
DISTRIBUTION

CHANNEL WAVEGUIDE    WEDGE-SHAPED JOINT STRUCTURE

WITH NO INTERFACE

WITH INTERFACE

INTERFACE

METHOD FOR INCIDENCE OF LIGHT INTO A PHOTONIC CRYSTAL OPTICAL WAVEGUIDE AND STRUCTURE THEREOF

CROSS-REFERENCE TO RELATED APPLICATIONS

This application is a continuation of International Application No. PCT/JP2004/003084, filed on Mar. 10, 2004, and claims priority to Japanese Patent Application No. 2003-070474, filed on Mar. 14, 2003, both of which are incorporated herein by reference in their entireties.

FIELD OF THE INVENTION

This invention relates to a technique of incidence of light into a photonic crystal, and more particularly to a method and an apparatus suited to improve efficiency of incidence of light into an optical waveguide formed in a photonic crystal.

BACKGROUND OF THE INVENTION

A photonic crystal is a crystal in which two or more materials having different indexes of refraction are periodically arranged in order of optical wavelength (usually 0.3 to 0.7 µm), in one dimension, or two dimensions, or three dimensions. The photonic crystal has the effect of strong confinement of light ascribable to a photonic band gap, and by taking advantage of this confinement effect of light, applications in various optical elements or miniaturized optical circuits are expected. It is also known that by employing a line defect in the photonic crystal, it is possible to form an optical waveguide in the photonic crystal.

However, when light directly enters the photonic crystal from a surrounding air, the amount of reflection by the crystal surface is great, and there are many cases in which light cannot travels into the crystal efficiently. Moreover, even when light travels into the optical waveguide formed in the photonic crystal, no highly efficient method for controlling light so as to enter the crystal has been established. For example, as described in non-patent reference document 1 (Electronics Letters from M. Tokushima et al., 2001, Vol. 37, No. 24), the transmission loss was an extremely large 40 to 50 dB.

[Non-Patent Document 1]
  M. Tokushima et al., Electronics Letters, pgs. 1454-1455, 2001, Vol. 37, No. 24
[Non-Patent Document 2]
  J. Ushida et al., Applied Physics Letters, pgs. 7-9, 82, 7 (2003)

SUMMARY OF THE INVENTION

As described above, with the conventional techniques, light cannot enter a photonic crystal optical waveguide with high efficiency.

Accordingly, it is an object of the present invention to provide a method and apparatus for making light enter with high efficiency a photonic crystal or an optical waveguide formed in a photonic crystal.

In accordance with one aspect of the present invention, there is provided a method for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions; said method comprising:
  matching a wave number of light in the optical waveguide formed in the photonic crystal with a wave number of the incident light outside of the photonic crystal, thereby enhancing efficiency of the incidence of light into said optical waveguide.

In accordance with a second aspect of the present invention, there is provided a method a method for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions; said method comprising:
  matching a wave number vector of light in the waveguide formed in said photonic crystal with a wave number vector of the incident light on the outside of said photonic crystal, thereby enhancing efficiency of the incidence of light into said optical waveguide In accordance with a third aspect of the present invention, there is provided a method a method for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions; said method comprising:
  matching the intensity ratio of electric field to magnetic field of light in the waveguide formed in the photonic crystal with the intensity ratio of electric field to magnetic field of the incident light that travels on the outside of the photonic crystal.

In accordance with a fourth aspect of the present invention, the method according to the above mentioned third aspect of the present invention, comprises the step of matching the intensity ratio of electric field to magnetic field of incident light on the end surface of the optical waveguide formed in the photonic crystal with the intensity ratio of electric field to magnetic field of incident light travelling on the outside of the photonic crystal.

In accordance with a fifth aspect of the present invention, the method according to the above mentioned third or fourth aspect of the present invention, comprises the step of matching the distribution shape of intensity ratio of electric field to magnetic field of incident light on the end surface of the waveguide formed in the photonic crystal with the distribution shape of intensity ratio of electric field to magnetic field of incident light outside of the photonic crystal.

In accordance with a sixth aspect of the present invention, the method according to the above mentioned third or fourth aspect of the present invention, comprises the step of matching the intensity ratio of electric field to magnetic field of incident light outside of the photonic crystal by making the value of the intensity ratio of electric field to magnetic field of incident light on the end surface of the waveguide formed in the photonic crystal less than 1, with the value of the intensity ratio being normalized by the intensity ratio of electric field to magnetic field in a vacuum.

In accordance with a seventh aspect of the present invention, the method according to the above mentioned third or fourth aspect of the present invention, comprises the step of matching the intensity ratio of electric field to magnetic field of incident light outside of the photonic crystal by using from a first band to near a second band of the photonic bands on the dispersion curve of the photonic crystal.

In accordance with an eighth aspect of the present invention, the method according to one of first to fifth aspects of the present invention, the comprises the step of matching the light-intensity distribution in the waveguide mode of incident light on the end surface of the waveguide formed in the photonic crystal with the light-intensity distribution of incident light outside of the photonic crystal.

In accordance with a ninth aspect of the present invention, there is provided a structure for incidence of light into a photonic crystal optical waveguide, for realizing the method according to one of the first to fifth aspects, wherein said structure comprises:

a line defect optical waveguide, as said photonic crystal optical waveguide, including a line defect provided in said photonic crystal; and a channel waveguide including the same material as said line defect section, said channel waveguide being joined to said line defect optical waveguide.

In accordance with a tenth aspect of the present invention, there is provided a structure for incidence of light into a photonic crystal optical waveguide with high efficiency, for realizing the method according to one of the first to fifth and eighth aspects, wherein a line defect optical waveguide that is formed by producing a line defect in the photonic crystal is joined to a channel waveguide made from the same material as the line defect section, and wherein in the joint section between the channel waveguide and the photonic crystal line defect waveguide comprises a channel waveguide having a joint structure that satisfies the condition specified by one of the above mentioned first to fifth, and eight aspects.

In accordance with an eleventh aspect of the present invention, there is provided a structure for incidence of light into a photonic crystal optical waveguide with high efficiency, for realizing the method according to one of the first to fifth and eighth aspects, wherein a line defect optical waveguide formed by implementing a line defect in the photonic crystal is joined to a channel waveguide made from the same material as the line defect section, and wherein the joint structure according to the above mentioned tenth aspect, used in the joint section between the channel waveguide and the photonic crystal line defect waveguide comprises a channel waveguide having a joint structure formed using a material that has an index of refraction different than both the channel waveguide and photonic crystal.

In accordance with a twelfth aspect of the present invention, there is provided a structure for incidence of light into a photonic crystal optical waveguide with high efficiency, which realizes the method according to one of the first to sixth aspects, wherein a line defect optical waveguide that is formed by implementing a line defect in the photonic crystal is joined to a channel waveguide made from the same material as the line defect section, and wherein the joint structure according to the above mentioned tenth aspect, used in the joint section between the channel waveguide and the photonic crystal line defect waveguide comprises a wedge-shaped channel waveguide.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE PREFERRED EMBODIMENTS

The present invention will be described in more detail with reference to the accompanying drawings.

First, the various methods for attaining high efficiency of incidence of light into an optical waveguide formed in the photonic crystal will be described.

Figure 1:
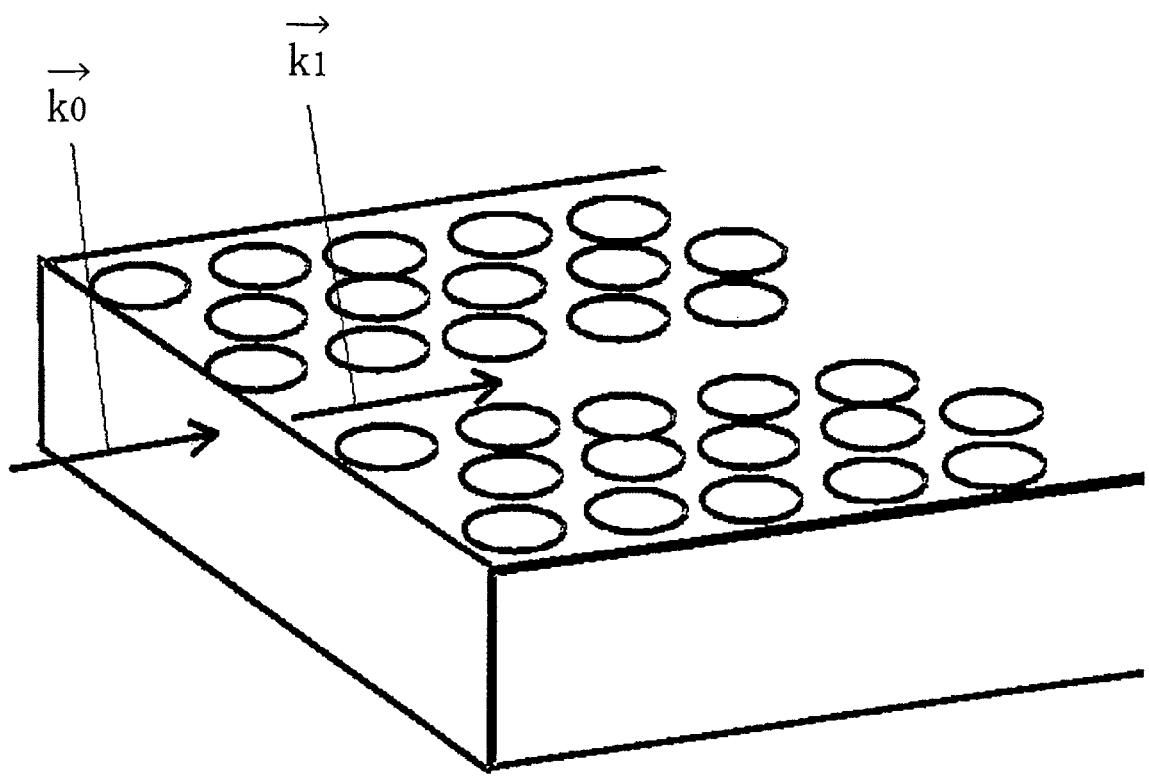
FIG. 1 is a diagram for explaining the concept of wave number matching between the photonic crystal optical waveguide and the outside.

As a first embodiment of the invention, will be described a method of matching wave numbers between the photonic crystal optical waveguide and the outside. FIG. 1 is a concept drawing showing that method.

Figure 2:
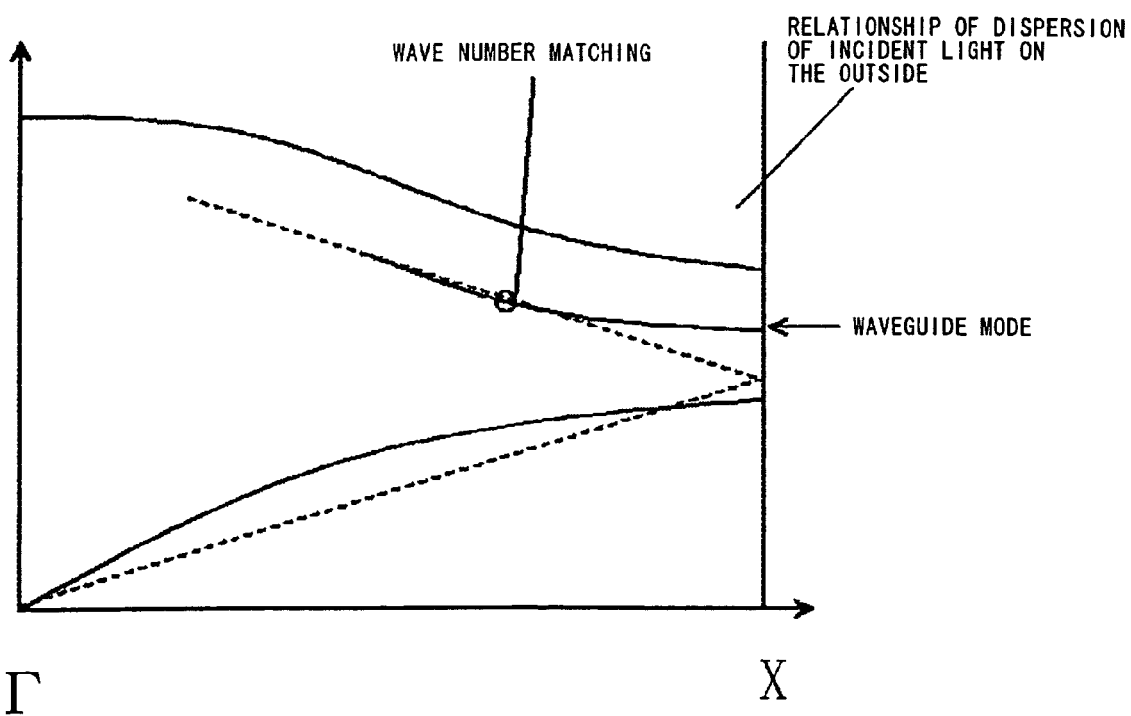
FIG. 2 is a diagram showing wave number matching on the photonic band diagram.
Figure 3:
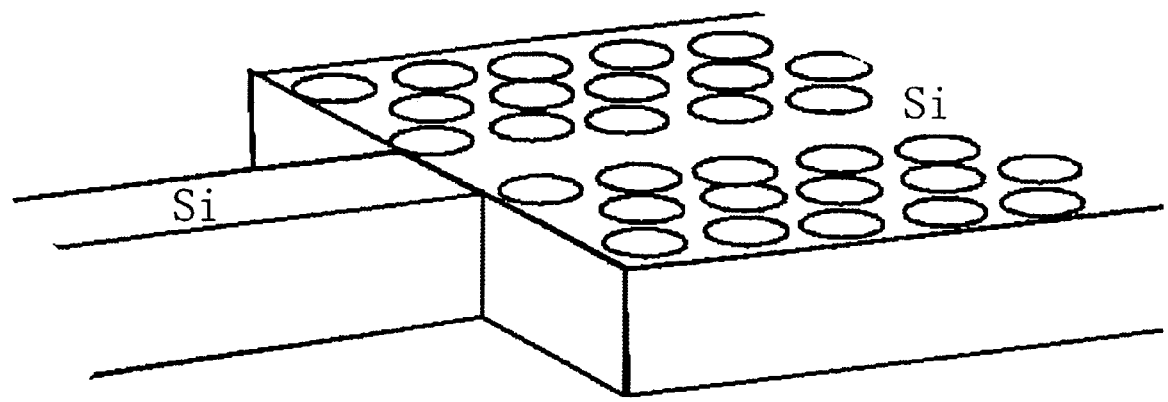
FIG. 3 is a diagram showing a photonic crystal optical waveguide interface.

Only when the optical wave number in the optical waveguide formed in the photonic crystal matches the wave number of the incident light on the outside does the efficiency of the incident light increase. In other words, as shown in FIG. 2, when the wave number $k1$ in the wave-guiding mode of the photonic crystal optical waveguide and the wave number $k0$ of the incident light on the outside of the photonic crystal match the wave number $k$ on the photonic band diagram (wave number matching), the incidence efficiency of light increases. In FIG. 2 the frequency ω is shown along the vertical axis, and the wave number k is shown along the horizontal axis.

With the equation of motion, the wave number of light corresponds to the momentum. In other words, passing from medium 1 to medium 2 without the wave number k changing, is equivalent to the case in which a certain substance tries to pass through from medium 1 to medium 2 and is able to pass with the momentum being conserved. With the momentum conserved, it is possible for a matter to travel from medium 1 to medium 2 without the velocity and direction changing.

Normally, in the case where the material of the optical waveguide section in the photonic crystal comprises a material such as Si with a large index of refraction, when light travels from the surrounding air or from a vacuum, it is difficult to make the wave numbers match on the photonic band diagram and hence, as means to solve the problem, it is necessary to make the index of refraction of the medium from which the light travels into the photonic crystal identical to the index of refraction of the material of the optical waveguide section in the photonic crystal. In other words, light does not directly enter the photonic crystal optical waveguide from the surrounding air, but light enters at least an intermediate optical waveguide (interface) comprising a material (for example Si) having an index of refraction, value of which differs little from that of the optical waveguide section in the photonic crystal such that light travels through the intermediate optical waveguide into the photonic crystal optical waveguide. Using the same material as the material of the optical waveguide section in the photonic crystal as the material for this interface is ideal. Furthermore, it is preferred that matching of the wave numbers be performed by matching not only size but vectors as well (matching of wave-number vectors).

Next, as a second embodiment of the invention will be described a method of matching the ratio of the electric field to magnetic field of light in the optical waveguide formed in the photonic crystal with the ratio of electric field to magnetic field of the incident light travelling outside the photonic crystal.

Figure 4:
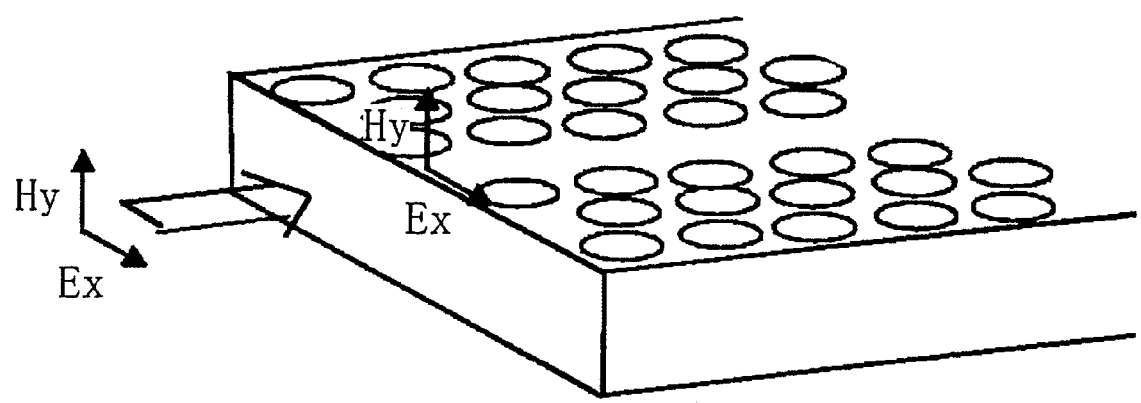
FIG. 4 is a diagram for explaining the method for matching the electric field to magnetic field ratio for the photonic crystal optical waveguide and the outside.

This method is illustrated in FIG. 4. The ratio of electric field to magnetic field (Ex/Hy) of the light in the wave-guide mode of the photonic crystal optical waveguide is matched with the ratio of electric field to magnetic field (Ex/Hy) of the incident light that is travelling on the outside of the photonic crystal.

The concept of the method according to the present embodiment, is basically the same as the method often performed for electric circuits of matching impedance. However, it differs in that in the case of electric circuits, impedance is stipulated by the ratio of voltage to current (V/I), whereas in an optical waveguide, it is regulated by the ratio of electric field to magnetic field (Ex/Hy).

Even when matching the ratios of electric field to magnetic field, when the material of the optical waveguide section in the photonic crystal is a material such as Si with a large index of refraction, it is difficult to match the ratios of electric field to magnetic field when light travels from the surrounding air or a vacuum; and as a solution in this case, it is necessary to use a material for the medium through which the incident light travels into the photonic crystal optical waveguide that has about the same index of refraction as Si. In order to match the intensity ratios of electric field to magnetic field in this kind of photonic crystal optical waveguide, it is essential that the intensity ratios of electric field to magnetic field between differing waveguides be matched, particularly on the end surfaces of the joint between waveguides. FIG. 5C shows the result of the ratios of electric field to magnetic field in the waveguide mode of a photonic crystal optical waveguide made of Si and a Si-channel optical waveguide found from FDTD electric field and magnetic field analysis.

FIG. 5C shows that the intensity ratio of electric field to magnetic field in the waveguide mode at a certain frequency in the Si-channel optical waveguide is constant regardless of the location. In contrast to the case in the Si-channel optical waveguide, the intensity ratio of electric field to magnetic field in the waveguide mode in the photonic crystal optical waveguide greatly differs depending on the location in the cross section of the photonic crystal as shown in graphs A and B that correspond to the intensity ratios of electric field to magnetic field in cross sections as shown in FIGS. 5A and 5B respectively.

Figure 5A:
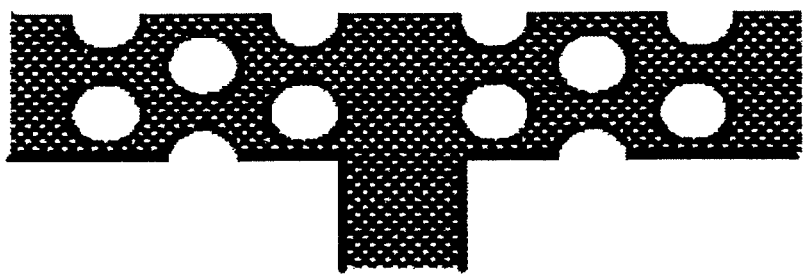
FIGS. 5A and 5B are diagrams illustrating cross sections of the photonic crystal, respectively.
Figure 5B:
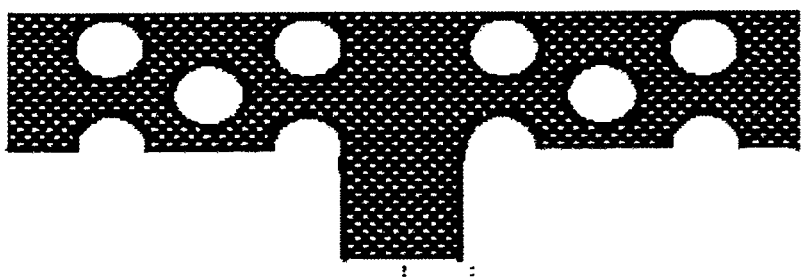
Figure 5C:
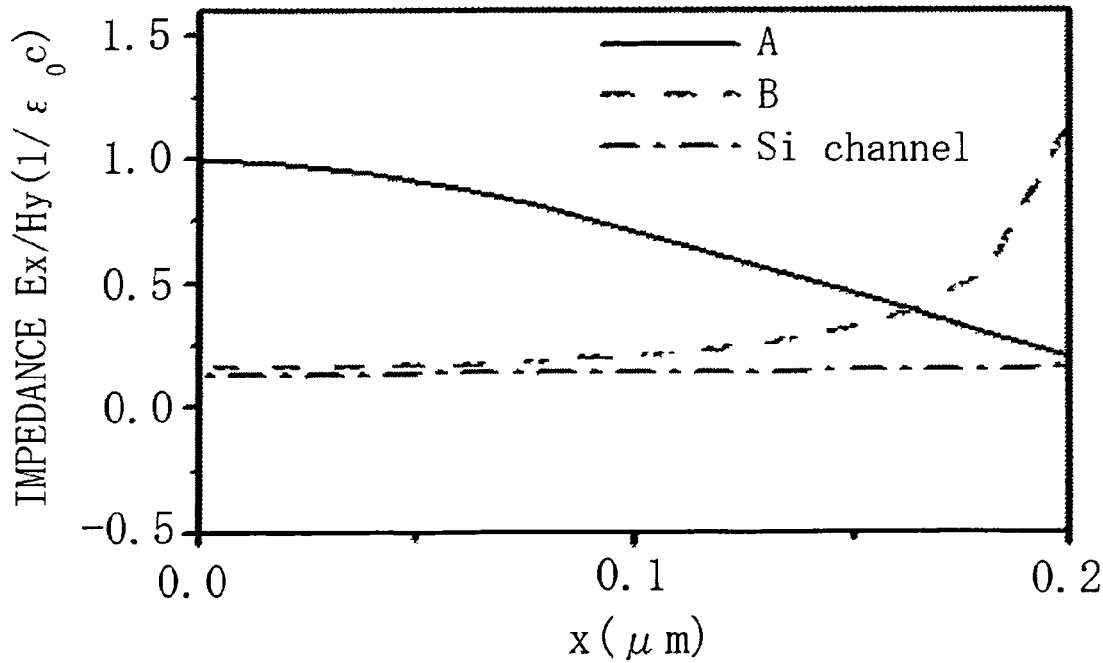
FIG. 5C is a diagram showing the FDTD calculation results for the distribution of the ratio of electric field to magnetic field.

For example, in case wherein the cross-sectional surface of the photonic crystal is a surface equivalent to that shown in FIG. 5A, the ratio of the electric field to magnetic field is large in the center of the cross-sectional surface of the optical waveguide and in case wherein the cross-sectional surface of the photonic crystal is a surface equivalent to that shown in FIG. 5B, the cross-sectional surface is a surface equivalent to B, the ratio becomes large on both ends of the cross-sectional surface of the optical waveguide. Therefore, if both a Si-channel optical waveguide and photonic crystal optical waveguide are to be joined, joining them such that the intensity ratios of electric field to magnetic field of both match at the joint surface is essential for maximizing the joint efficiency.

Next, the method according to a third embodiment of the present invention will be described. As shown by Band 1 or Band 2 in FIG. 6C, the value of the intensity ratio of the electric field to magnetic field in the photonic crystal optical waveguide, which is normalized by the intensity ratio of the electric field to magnetic field in a vacuum, may preferably be a positive value of 1 or less. The reason for this will be described below.

According to the method described in non-patent document 2 (J. Ushida et al., Applied Physics Letters, 82, pgs. 7-9, (2003)), it is seen that by analytically deriving the reflectance of an arbitrary 1-dimensional photonic crystal, the inverse of the intensity ratio of the electric field to magnetic field on the surface of a photonic crystal, which is normalized by the intensity ratio of the electric field to magnetic field in a vacuum, corresponds to the index of refraction that takes into consideration the Fresnel reflection of a photonic crystal.

Taking the value that is obtained by dividing that value by the index of refraction of the outside of the photonic crystal, or in other words, taking the medium on the incoming side of the incident light to be α, when α is greater than 1, non-reflective coating of the photonic crystal becomes possible. The possibility of a non-reflective coating of the photonic crystal means that it is possible to theoretically make the joint loss of the light entering the photonic crystal zero. On the other hand, when α is less than 1 corresponds to when light travels from a vacuum into a medium having an index of refraction that is less than 1. However, no medium having an index of refraction in a vacuum of less than 1 actually exists, so in this case, actually making the loss of incident light zero cannot be realized.

Figure 6A:
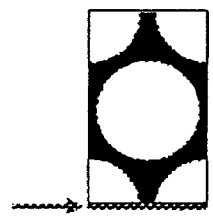
FIG. 6A is a diagram showing a unit cell of a Si rod in a triangular lattice in air.
Figure 6B:
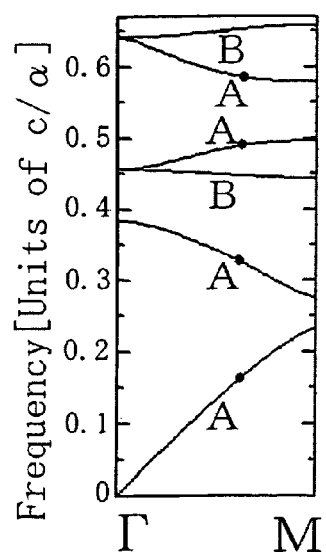
FIGS. 6B and 6C are diagram showing calculation results by the planar expansion method for the ratio of electric field to magnetic field of the photonic crystal.
Figure 6C:
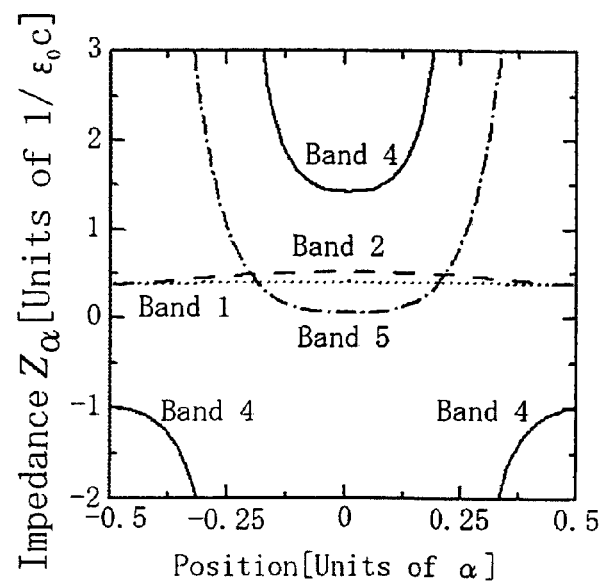

FIG. 6C shows the intensity of the electric field and magnetic field of a cross section of a photonic crystal, however, the same conditions apply for a 3-dimensional photonic crystal optical waveguide in real space. Accordingly, when α is less than 1, it becomes possible to match the intensity of both the electric field and magnetic field at a joint between a Si-channel optical waveguide and a photonic crystal optical waveguide. Therefore, α is preferably less than 1. Furthermore, it is preferred that the distribution of the intensity ratios of the electric field to the magnetic field at a joint match.

Figure 7:
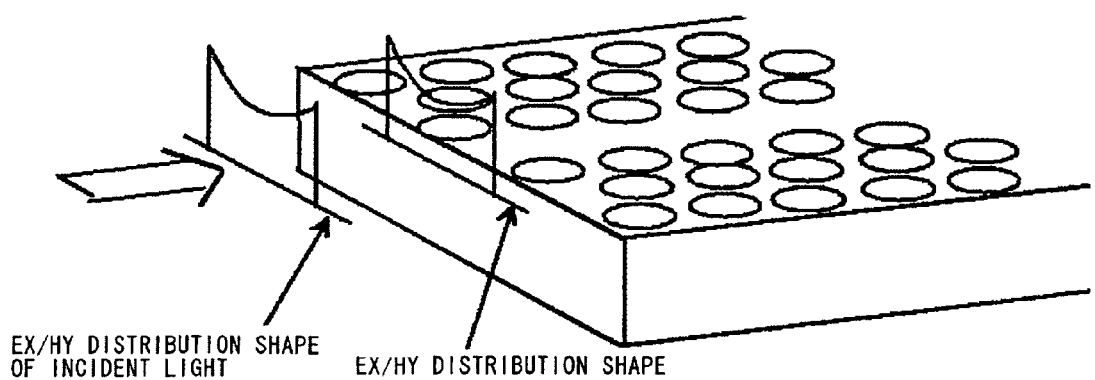
FIG. 7 is a diagram for explaining a method for matching the distribution of the ratio of electric field to magnetic field of the photonic crystal optical waveguide and the outside.

Next, a method according to a fourth embodiment of the invention will be described with reference to FIG. 7. The method according to the present invention, matches distribution of intensity ratios of electric field to magnetic field at the joint between a Si-channel waveguide and a photonic crystal optical waveguide.

As was described in the second embodiment, it is essential that the intensity ratios of electric field to magnetic field at the end surfaces of a joint between differing waveguides of a photonic crystal optical waveguide be matched. Furthermore, by matching the intensity distribution of electric field to magnetic field on the joint surface of a photonic crystal optical waveguide, the intensity ratio of electric field to magnetic field becomes the same on the joint boundary at any location on the joint cross section, so it is possible to further decrease the joint loss of both.

Next, a fifth embodiment of the invention will be described. FIG. 6C shows the distribution on a cross section of a photonic crystal of the intensity ratio of electric field to magnetic field for band A in the joint mode shown in FIG. 6B, where the optical waveguide and light are joined, from the first-order band to a higher-order bands. For the fourth band and fifth band, the distribution of intensity of the electric field and magnetic field changes greatly on the surface of the optical waveguide, however, for the first and second bands, there is relatively small distribution. Considering the optical-waveguide mode that is formed in a photonic crystal band, in the optical-waveguide mode attached to the band near a high-order band such as the fourth band or fifth band, the distribution of intensity of the electric field and magnetic field on the surface of the optical waveguide changes greatly, however, in the optical waveguide mode near the first band or second band, the change in distribution of intensity of the electric field and magnetic field on the surface of the optical waveguide is relatively gradual, and there is a frequency such that the change becomes smaller.

In other words, by using a waveguide mode for the optical waveguide in a photonic crystal that exists from the first band to near the second band of the photonic crystal, it is possible to match the distribution of intensity ratio of electric field to magnetic field with a Si-channel optical waveguide.

Figure 8:
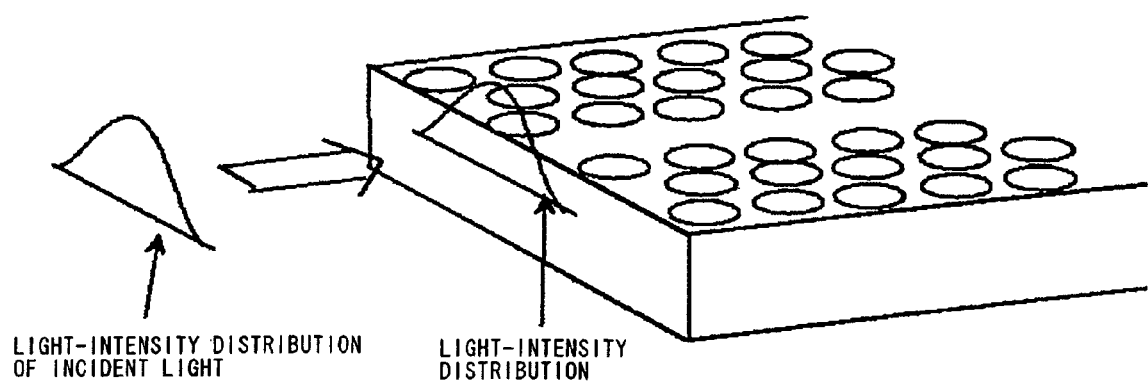
FIG. 8 is a diagram that shows matching of the light-intensity distribution of the photonic crystal optical waveguide and the outside.

Next, a sixth embodiment of the present invention will be described. The method according to the present embodiment matches the light-intensity distribution in the waveguide mode of the optical waveguide formed in a photonic crystal with the light-intensity distribution of the incident light outside the photonic crystal will be described. FIG. 8 illustrates the matching according to the present embodiment. By matching the light-intensity distribution on the end surface where the light travels in the waveguide mode of the photonic crystal optical waveguide with the light-intensity distribution of the incident light, it is possible to improve the efficiency of the incident light passing into the photonic crystal optical waveguide.

Generally, when the waveguide mode changes, the joint loss becomes large. Guiding light from the outside of the photonic crystal to the photonic crystal optical waveguide while the light-intensity distribution is matched means that light is guided on the outside and in of the photonic crystal without changing the waveguide mode of the light. As a structure for realizing the method according to the present embodiment, there is provided such a structure in which the channel-optical waveguide is attached to the section through which light travels into the photonic crystal optical waveguide.

This structure is effective in the case where the electric field distribution in the waveguide mode of the photonic crystal optical waveguide is relatively near a Gaussian distribution. In other words, the light-intensity distribution in the basic mode in the channel waveguide has a shape that is close to a Gaussian distribution. If the light-intensity distribution in the waveguide mode in the photonic crystal optical waveguide is near a Gaussian distribution, the high efficiency of incidence of light, travelling from the channel optical waveguide into the photonic crystal optical waveguide can be realized. Of course, it is not necessary to use a channel waveguide just in order to obtain an incident light beam having a simple Gaussian light-intensity distribution. However, using a channel-waveguide for the interface is important for making it possible to match wave numbers and match intensity ratios of electric field to magnetic field as described above.

Next, a seventh embodiment of the invention will be described. FIG. 6A shows a unit cell (area×2) of a Si rod in a triangular lattice in air (rod radius r=0.4335a, lattice constant: a, Si index of refraction=3.45), and FIG. 6B shows a photonic band diagram in the ΓM direction for the TM polarization (electric field is parallel with the rod) component of this photonic crystal. The symbols A and B displayed for each band in FIG. 6B indicate the joint mode (A), in which it is possible to join the light from outside the photonic crystal, and non-joint mode (B). The intensity ratio of electric field to magnetic field (normalized by the ratio of electric field to magnetic field on the surface in a vacuum) on the surface for the line indicated by the arrow FIG. 6A in the joint mode (wave number=2 Γ M/3) indicated by the dots in FIG. 6B of the photonic band of these symbols A, and B is shown in FIG. 6C.

The line indicated by the arrow in FIG. 6A is a reflection plane of an infinite photonic crystal, so the value of the intensity ratio of electric field to magnetic field on the surface is a real number. As can be seen from FIG. 6C, the change in the spatial distribution of the intensity ratio of electric field to magnetic field for Band 1 and Band 2 is more gradual than that in the spatial distribution of Band 4 and Band 5, and the value of that ratio is positive and less than 1. When the intensity ratio of electric field to magnetic field that is normalized by the intensity ratio of electric field to magnetic field in a vacuum is less than 1 and the spatial distribution is flat, the method for approximately matching the intensity ratio of a 1-dimensional electric field to magnetic field, or in other words, a method that is the same as that of the third embodiment of the invention is capable of reducing the joint loss. Therefore, it can be seen that by applying a uniform medium film, the intensity ratio of electric field to magnetic field can be approximately matched for Band 1 and Band 2.

Actually, even in the line defect mode near Band 1 and Band 2, the distribution of intensity of electric field and magnetic field is relatively gradual, and the normalized value is also less than 1. FIG. 5C shows the distribution of normalized intensity ratio of electric field to magnetic field. The intensity ratio of electric field to magnetic of both the channel waveguide and photonic crystal optical waveguide is less than 1. This indicates that by using the method described in the third embodiment of the invention, conditions were satisfied that make it possible to match the distribution of intensity ratio of electric field to magnetic field with that of a Si-channel optical waveguide.

Figure 9:
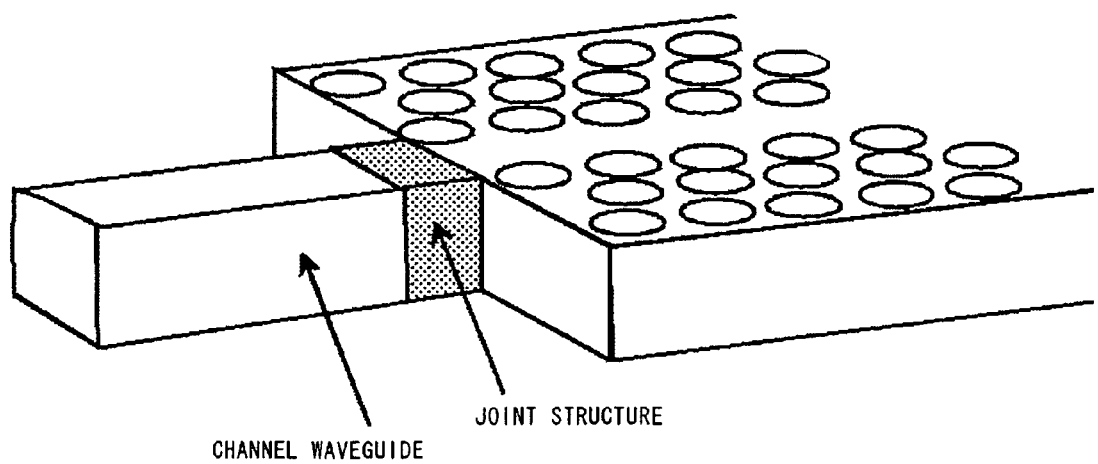
FIG. 9 is a diagram that shows the structure of the interface between the photonic crystal optical waveguide and the outside.

FIG. 9 shows a channel-waveguide interface according to an eighth embodiment of the present invention. The photonic crystal is formed on a Si layer having a thickness of approximately 0.2 to 0.3 µm, with round holes having a diameter of approximately 0.3 µm arranged in a triangular lattice such that the period of the lattice is approximately 0.45 µm. The optical waveguide is formed such that there is formed a line defect which is a line with no holes in the Γ-K direction. The medium of the optical waveguide section is made of Si (with an index of refraction of approximately 3.5). Above and below the Si layer can be SiO2 or air.

In order to realize high efficiency of incidence of light into the line defect optical waveguide formed in the slab-shaped photonic crystal having a triangular lattice made up of air holes, a channel optical waveguide comprising the same Si material as the photonic crystal optical waveguide is effective. By using this kind of interface structure having a Si-channel optical waveguide, it is possible to greatly improve the efficiency of incidence of light into the photonic crystal optical waveguide when compared with direct incidence of light into the photonic crystal optical waveguide from the surrounding air (in which case the joint loss is 10 dB or greater). From estimation through calculation, it is known that the joint loss between the Si-channel optical waveguide and the photonic crystal optical waveguide can be decreased to approximately 2 dB, and that the joint loss from the air to the Si-channel optical waveguide can be decreased to about 1 dB or less, so in the case of using this interface, it is possible to keep the overall joint loss to 3 dB or less. The effect of the interface described here is to serve the role of matching the wave number or to match the ratio of electric field to magnetic field described above.

Referring to FIG. 9, an example of a Si channel waveguide interface according to a ninth embodiment of the present invention will be described. The photonic crystal is formed on a Si layer having a thickness of approximately 0.2 to 0.3 µm, with round holes having a diameter of approximately 0.3 µm arranged in a triangular lattice such that the period of the lattice is approximately 0.45 µm. The optical waveguide is formed such that there is a line defect, which is a line with no holes in the Γ-K direction. Also, the medium of the optical waveguide section is made of Si (with an index of refraction of approximately 3.5). Above and below the Si layer can be SiO2 or air.

As a method for improving efficiency of incidence of light into the line defect optical waveguide formed in this kind of slab-shaped photonic crystal having air holes in a triangular lattice, the method of using a joint structure between the photonic crystal optical waveguide section and the Si-channel waveguide that uses a material or structural element whose index of refraction is an intermediate value between both that of the photonic crystal optical waveguide and Si-channel waveguide as an interface is effective. By using this kind of joint structure, it is possible to greatly improve the efficiency of incidence of light into the photonic crystal optical waveguide when compared with the direct incidence of light into the photonic crystal optical waveguide from the surrounding air (in which case the joint loss is 10 dB or greater).

Figure 10:
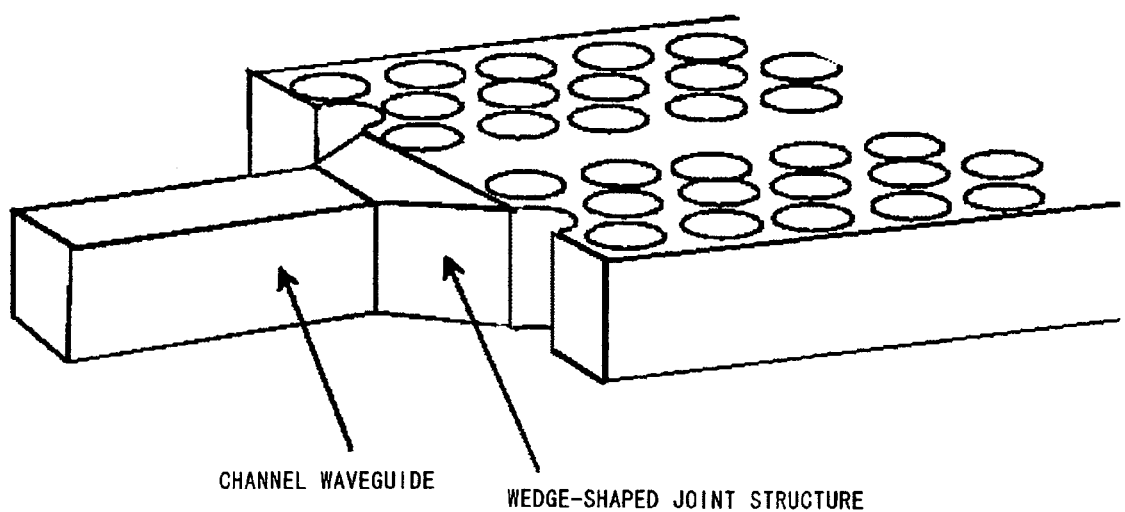
FIG. 10 is a diagram that shows the structure of a wedge-shaped interface between the photonic crystal optical waveguide and the outside.

Next, a wedge-shaped Si-channel optical waveguide interface, which is a further improvement of the structure of this interface, will be described, as a tenth embodiment of the invention. FIG. 10 shows a structure that makes it possible to match the distribution of intensity ratios of electric field to magnetic field in the waveguide mode of a photonic crystal optical waveguide made of Si, and a Si-channel optical waveguide. As shown in FIG. 10, by using a wedge-shaped structure in the joint section between the photonic crystal optical waveguide and Si-channel optical waveguide, it is possible to match the distribution of intensity ratios of electric field to magnetic field on the joint surface of both. The length of the waveguide of the wedge-shaped structure is 0.3 µm, and the width of the joint surface on the side of the photonic crystal is 1.26 µm.

Figure 11:
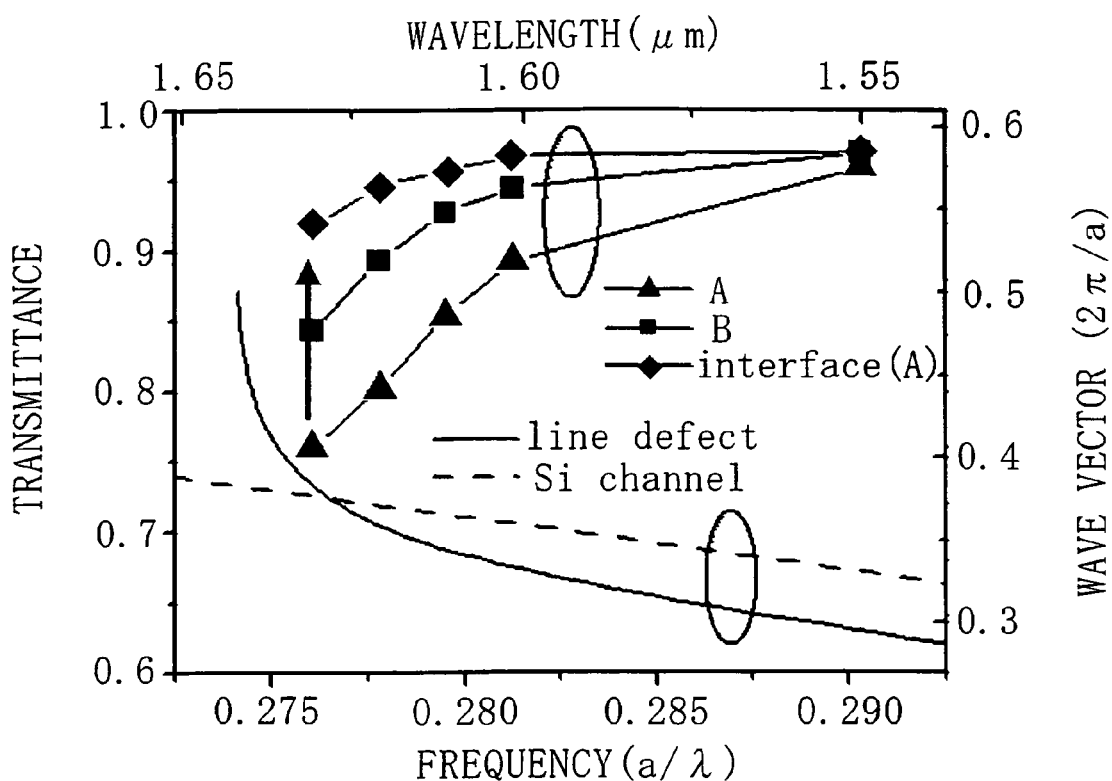
FIG. 11 is a diagram showing the joint efficiency between the photonic crystal optical waveguide and the outside.

FIG. 11 shows the wavelength dependence of the light transmittance in the joint section between the Si-channel optical waveguide and photonic crystal optical waveguide. By using a wedge-shaped structure as the interface, the optical joint loss is dramatically improved from 0.33 dB to 0.14 dB for a light wavelength of 1.60 µm, and from 1.2 dB to 0.35 dB for a 1.63 µm wavelength. Here, if the length of the wedge-shaped waveguide is 0.3 µm, the joint loss is improved as shown in FIG. 11. On the other hand, if the length of the wedge-shaped waveguide is in the range of 0.6 to 0.7 µm, the joint loss becomes larger.

Figure 12A:
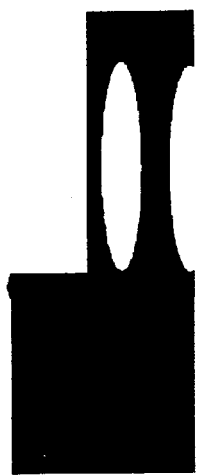
FIGS. 12A to 12D are diagrams showing the FDTD calculation result for the distribution of the ratio of electric field to magnetic field at the joint between the photonic crystal optical waveguide and the outside with no interface and with interface.
Figure 12B:
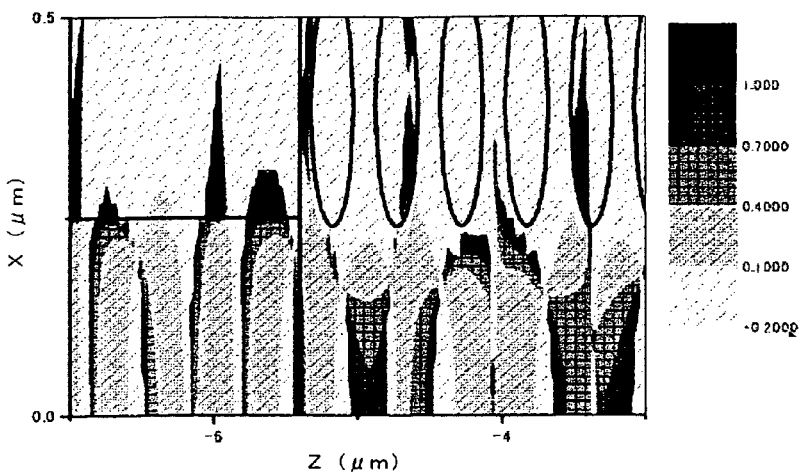
Figure 12C:
Figure 12D:
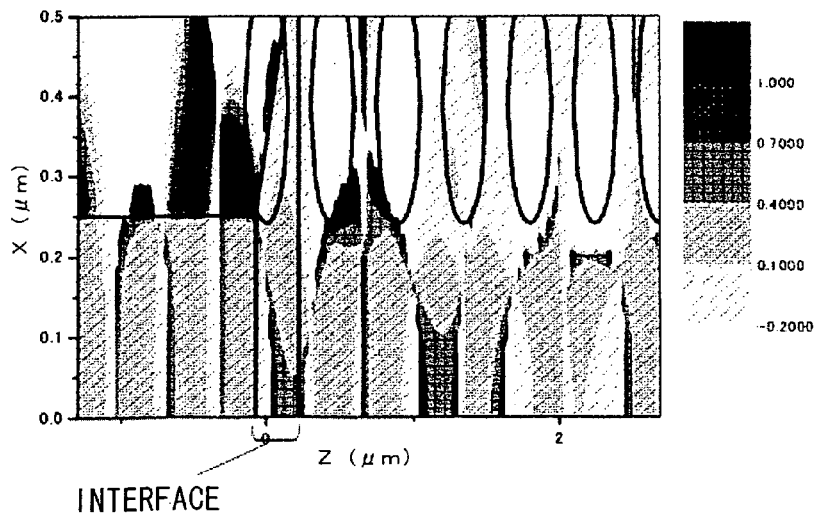

FIGS. 12B and 12D show results for comparing the distribution of intensity ratios of electric field to magnetic field at the joint section for when an interface is not used and when an interface is used. In the distribution of intensity ratio of electric field to magnetic field, the dark portion indicates an area in the photonic crystal where the value is high when not using an interface. On the other hand, when a wedge-shaped interface having a waveguide length of 0.3 µm is used, as shown in FIG. 12D, it can be seen that these dark areas decrease and that the electric field and magnetic field from the Si-channel optical waveguide to the photonic crystal are distributed with the same concentration. This shows that the value of the intensity ratio of electric field to magnetic field of the photonic crystal optical waveguide decreases near the joint. Furthermore, in the case of a wedge-shaped interface having a waveguide length of 0.6 to 0.7 µm in which the joint loss becomes large as described above, the value of the ratio of electric field to magnetic field of the photonic crystal optical waveguide becomes large in the interface section and near the joint, which indicates that the distribution of intensity ratios of electric field to magnetic field are not well matched.

The present invention provides a method for enhancing efficiency of incidence of light into a photonic crystal optical waveguide and hence this method can be applied to all photonic crystal optical elements. Also, in the disclosure of this invention, an example was described for the case in which light travels into a so called line defect optical waveguide, which is a line defect that is introduced in the photonic crystal, however, the mode for practicing an optical waveguide is not limited to a line defect type optical waveguide. The optical waveguide could also be any optical waveguide for guiding light by the difference in the index of refraction, such as in a conventional optical waveguide. Moreover, even without forming an optical waveguide in the photonic crystal, as long as there is a structure capable of guiding light, it is evident that the method and structure described above can be applied.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A photonic crystal device comprising:
   a photonic crystal having an optical waveguide; said photonic crystal including two or more materials having different indexes of refraction arranged periodically;
   a joint member having one end arranged in contact with an incident end of said photonic crystal optical waveguide; and a second optical waveguide having one end arranged in contact with the opposite end of said joint member;

wherein light entering said second optical waveguide travels, through said second optical waveguide and said joint member, into said photonic crystal optical waveguide, and wherein the structures of the photonic crystal optical waveguide, the joint member, and the second optical waveguide are configured such that the intensity ratio of electric field to magnetic field of said photonic crystal optical waveguide and said second optical waveguide match at the point where they join.

2. The photonic crystal device according to claim 1, wherein the index of refraction of said joint member has a value that is between index of refraction of said second optical waveguide and said photonic crystal optical waveguide.

3. The photonic crystal device of claim 1, wherein the width of said joint member on the side that is in contact with said photonic crystal optical waveguide is greater than the width on the other side that is in contact with said second optical waveguide.

4. The photonic crystal device according to claim 1, wherein the intensity ratio of electric field to magnetic field of said photonic crystal optical waveguide and said second optical waveguide differs depending upon the location of the cross-section of the photonic crystal optical waveguide where said photonic crystal optical waveguide and said second optical waveguide join.

5. The photonic crystal device according to claim 4, wherein the ratio of the electric field to the magnetic field is larger in the center of the cross-sectional surface of the photonic crystal optical waveguide.

6. The photonic crystal device according to claim 4, wherein the ratio of the electric field to the magnetic field is larger on both ends of the cross-sectional surface of the photonic crystal optical waveguide.

7. A structure for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions, by matching a wave number of light in the optical waveguide formed in the photonic crystal with a wave number of the incident light outside of the photonic crystal, thereby attaining high efficiency of the incidence of light into said optical waveguide; said structure comprising:
- a line defect optical waveguide, as said photonic crystal optical waveguide, including a line defect provided in said photonic crystal; and
- a channel waveguide including the same material as said line defect section, said channel waveguide being joined to said line defect optical waveguide,
- wherein the dimensions of the channel waveguide with respect to the line defect optical waveguide are configured such that the wave number is matched.

8. A structure for incidence of light into a photonic crystal optical waveguide, adapted to realize the method as defined in claim 7, wherein the intensity ratio of electric field to magnetic field of said line defect optical waveguide and said channel waveguide differs depending upon the location of the cross-section of the line defect optical waveguide where said line defect optical waveguide and said channel waveguide join.

9. The structure according to claim 8, wherein the ratio of the electric field to the magnetic field is larger in the center of the cross-sectional surface of the line defect optical waveguide.

10. The structure according to claim 8, wherein the ratio of the electric field to the magnetic field is larger on both ends of the cross-sectional surface of the line defect optical waveguide.

11. A structure for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions, by matching a wave number of light in the optical waveguide formed in the photonic crystal with a wave number of the incident light outside of the photonic crystal, thereby attaining high efficiency of the incidence of light into said optical waveguide; said structure comprising:
- a line defect optical waveguide, as said photonic crystal optical waveguide, including a line defect provided in said photonic crystal;
- a channel waveguide including the same material as said line defect section, said channel waveguide being joined to said line defect optical waveguide; and
- a joint section between said channel waveguide and said line defect optical waveguide, including a joint structure;
- wherein said joint section between said channel waveguide and line defect waveguide, comprises a channel waveguide having a joint structure formed using a material that has an index of refraction different from both the channel waveguide and photonic crystal;
- wherein the dimensions of the channel waveguide with respect to the line defect optical waveguide are configured such that the wave number is matched.

12. A structure for controlling incidence of light into a photonic crystal optical waveguide, adapted to realize a method for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions, said method comprising matching a wave number of light in the optical waveguide formed in the photonic crystal with a wave number of the incident light outside of the photonic crystal, thereby attaining high efficiency of the incidence of light into said optical waveguide;

said structure comprising:
- a line defect optical waveguide, as said photonic crystal optical waveguide, including a line defect provided in said photonic crystal;
- a channel waveguide including the same material as said line defect section, said channel waveguide being joined to said line defect optical waveguide;
- and a joint section between said channel waveguide and said line defect optical waveguide, including a joint structure for realizing the method for controlling incidence of light into a photonic crystal optical waveguide, wherein incident light travels into an optical waveguide from an outside thereof, said optical waveguide being capable of guiding the light and formed in an photonic crystal including two or more types of materials having different indexes of refraction arranged periodically in any one of one dimension, two dimensions and three dimensions, said method comprising matching a wave number of light in the optical waveguide formed in the photonic crystal with a wave number of the incident light outside of the photonic crystal, thereby attaining high efficiency of the incidence of light into said optical waveguide, wherein the dimensions of the channel waveguide with respect to the line defect optical waveguide are configured such that the wave number is matched.

13. A photonic crystal device comprising:

a photonic crystal having an optical waveguide; said photonic crystal including two or more materials having different indexes of refraction arranged periodically, and a second optical waveguide having one end thereof being in contact with the incident end of said photonic crystal optical waveguide;

wherein light entering said second optical waveguide travels through said second optical waveguide into said photonic crystal optical waveguide, and wherein the structures of the photonic crystal optical waveguide and the second optical waveguide are configured such that the intensity ratio of electric field to magnetic field of said photonic crystal optical waveguide and said second optical waveguide match at the point where they join.

14. The photonic crystal device according to claim 13, wherein the intensity ratio of electric field to magnetic field of said photonic crystal optical waveguide and said second optical waveguide differs depending upon the location of the cross-section of the photonic crystal optical waveguide where said photonic crystal optical waveguide and said second optical waveguide join.

15. The photonic crystal device according to claim 14, wherein the ratio of the electric field to the magnetic field is larger in the center of the cross-sectional surface of the photonic crystal optical waveguide.

16. The photonic crystal device according to claim 14, wherein the ratio of the electric field to the magnetic field is larger on both ends of the cross-sectional surface of the photonic crystal optical waveguide.

17. The photonic crystal device according to claim 13, wherein said second optical waveguide comprises a material such that the difference between the index of refraction of said second optical waveguide and index of refraction of said photonic crystal optical waveguide is sufficiently small to allow light to travel through the second optical waveguide into the photonic crystal optical waveguide.

18. The photonic crystal device according to claim 13, wherein the distribution of intensity ratio of electric field to magnetic field of said photonic crystal optical waveguide and said second optical waveguide match on the surface where they join.

19. The photonic crystal device according to claim 13, wherein the waveguide mode of a predetermined band of the photonic crystal optical waveguide that exists in a predetermined band of said photonic crystal is used to match distribution of intensity ratio of electric field to magnetic field of said photonic crystal optical waveguide and said second optical waveguide.

* * * * *